(12) United States Patent
Irven et al.

(10) Patent No.: US 11,506,564 B2
(45) Date of Patent: Nov. 22, 2022

(54) PRESSURE TESTING DEVICE AND METHOD OF TESTING USING SAME

(71) Applicants: Timothy Christopher Irven, Dayton, OH (US); Caroll Sundheimer, Beach City, OH (US)

(72) Inventors: Timothy Christopher Irven, Dayton, OH (US); Caroll Sundheimer, Beach City, OH (US)

(*) Notice: Subject to any disclaimer, the term of this patent is extended or adjusted under 35 U.S.C. 154(b) by 101 days.

(21) Appl. No.: 17/239,763

(22) Filed: Apr. 26, 2021

(65) Prior Publication Data

US 2022/0341809 A1  Oct. 27, 2022

(51) Int. Cl.
*G01M 3/28* (2006.01)
*F17D 5/02* (2006.01)

(52) U.S. Cl.
CPC ............ *G01M 3/2815* (2013.01); *F17D 5/02* (2013.01)

(58) Field of Classification Search
CPC .. G01M 3/00; G01M 3/26–28; G01M 3/2815; F17D 5/02
See application file for complete search history.

(56) References Cited

U.S. PATENT DOCUMENTS

2004/0118186 A1* 6/2004 Shultis ................ G01M 3/2815
73/49.2

FOREIGN PATENT DOCUMENTS

CN   109282952 A  * 1/2019 ............. G01M 3/26
DE   29916500 U1  * 1/2000 .......... G01M 3/2815

* cited by examiner

*Primary Examiner* — Nguyen Q. Ha
(74) *Attorney, Agent, or Firm* — R. William Graham

(57) ABSTRACT

A device and method of pressure testing a conduit structure to determine if there is a leak in a conduit layout, which includes employing a pressure testing device having a first part having a coupling end for sealably connecting to a first conduit portion, a second part communicably connecting to the first part and having a valve connection adapted to receive one of a positive pressure source and a negative pressure source, and a pressure meter operably connected to the pressure testing device, wherein the valve is open to receive one of the positive pressure source and the negative pressure source, the pressure meter displays one of a positive pressure and a negative pressure, opening the valve to receive one of the positive pressure source and negative pressure source, and reading the pressure on the pressure meter to determine if the pressure is being maintained.

4 Claims, 1 Drawing Sheet

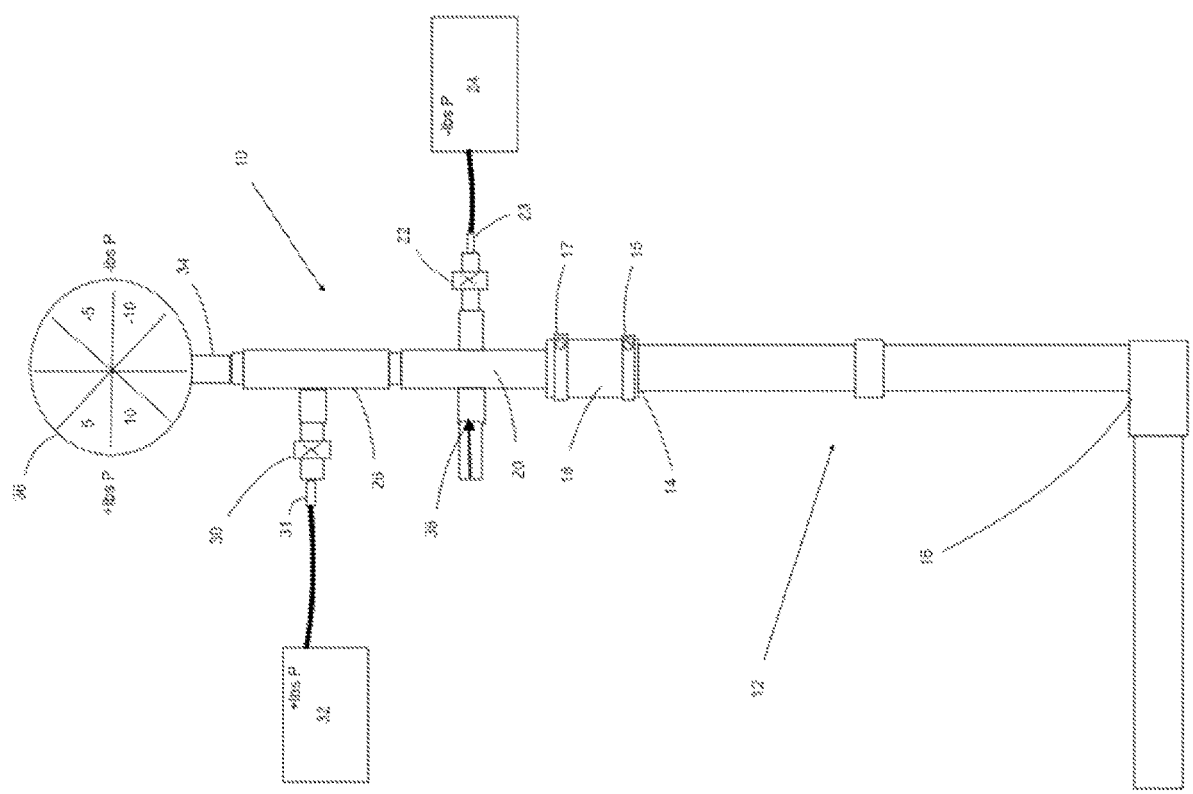

PRESSURE TESTING DEVICE AND METHOD OF TESTING USING SAME

BACKGROUND OF THE INVENTION

Field of Invention

This invention relates to the field of pressure testing devices and method of testing pressure in plumbing. More particularly, the invention pertains to pipe line pressure testing for the plumbing and gas fields.

Prior Art

In the field of pressure testing pipelines, the current field requirements mandate the plumber or gasman to use test devices on the job in order to test whether the lines are sufficiently leak-proof up to a predetermined pressure. Some create devices using various fittings and nipples, depending on the layout the plumber or gasman is working on in order to provide a suitable device to pressure test the line. Such attachments can typically be connected, e.g., screwed on, to a male pipe thread, e.g., ½" to 2" pipe diameter. Historically, the test used a positive pressure test on the lines, but more recently there has been a trend to use a negative pressure test due to potential harm to the user. While certain equipment in the field exists, there remains a need for a quick and simple device and method to handle varying types of tests in the field. This instant invention addresses these needs and will allow the plumber or gasman to save a considerable amount of time and money.

BRIEF SUMMARY OF THE INVENTION

It is an object of the invention is to provide an improved device for pressure testing conduit and pipelines.

It is another object to improve the method of testing pressure in conduit and pipelines.

Accordingly, one aspect of the instant invention is directed to a pressure testing device for testing a seal in a connected conduit layout having a first conduit portion of the conduit layout open for connection and a remainder of the conduit layout closed. The pressure testing device includes a first part having a coupling end for sealably connecting to the first conduit portion, a second part communicably connecting to said first part and having a first valve with a connection adapted to receive a negative pressure source, a third part communicably connecting to the second part having a second valve with a connection different than the first valve connection and adapted to receive a positive pressure source and a fourth part having a pressure meter operably connected to the fourth part, wherein the first valve and the second valve are independently actuatable such that the pressure meter reads a positive pressure when the second valve is open and the first valve is closed, so as to receive pressurized fluid from the positive pressure source, and reads a negative pressure when the first valve is open and the second valve is closed, so as to receive a vacuum from the negative pressure source.

An aspect of the invention is to provide a method of pressure testing a conduit structure to determine if there is a leak in the structure. In a broader sense, a method of pressure testing a conduit structure to determine if there is a leak in conduit layout is provided. The conduit structure has a first conduit portion of the conduit layout open for connection and a remainder of the conduit layout closed, and the method includes employing a pressure testing device. The pressure testing device has a first part having a coupling end for sealably connecting to the first conduit portion, a second part communicably connecting to the first part having a valve with a connection adapted to receive one of a positive pressure source a negative pressure source, and a pressure meter operably connected to the pressure testing device, wherein the valve is open to receive one of the positive pressure source and the negative pressure source, the pressure meter displays one of a positive pressure and a negative pressure. The method further includes opening the valve to receive one of the positive pressure source and negative pressure source, and reading the pressure on the pressure meter to determine if pressure is being maintained.

Another aspect of the invention is to provide a method of pressure testing a conduit structure to determine if there is a leak in the structure. The method includes employing a pressure testing device for testing a seal in a connected conduit layout which has a first conduit portion thereof open for connection and a remainder of the conduit layout closed. The method includes employing the device having a first part having a coupling end for sealably connecting to the first conduit portion, a second part communicably connecting to the first part and having a first valve with a connection adapted to receive a negative pressure source, a third part communicably connecting to the second portion and having a second valve with a connection different than part first valve connection and adapted to receive a positive pressure source and a fourth part having a pressure meter operably connected to the pressure testing device, wherein the first valve and said second valve are independently actuatable such that the pressure meter reads a positive pressure when the second valve is open and the first valve is closed, so as to receive the positive pressure source, and reads a negative pressure when the first valve is open and the second valve is closed, so as to receive the negative pressure source. The method includes a step of opening the first valve and closing the second valve and placing the conduit layout under a predetermined negative pressure through the first valve connection and reading the pressure meter to determine if the conduit layout is maintaining the predetermined negative pressure. The method includes another step of opening the second valve and closing the first valve and placing the conduit layout under a predetermined positive pressure through the second valve connection and reading the pressure meter to determine if the conduit layout is maintaining the predetermined positive pressure.

BRIEF DESCRIPTION OF THE SEVERAL VIEWS OF THE DRAWING

FIG. 1 is a schematize drawing of the pressure testing device of the invention.

DETAILED DESCRIPTION OF THE INVENTION

The pressure testing device of the instant invention is generally designated by the numeral 10. One aspect of the instant invention is directed to the pressure testing device 10 for testing a seal in a connected conduit layout 12. The conduit layout 12 has a first conduit portion 14 open for connection and a remainder 16 of the conduit layout closed. The pressure testing device 10 includes a first part 18 for sealably connecting to the first conduit portion 14. A second part 20 communicably connects to the first part 18 and has a first valve 22 with a connection 23 adapted to receive a negative pressure source 24 (vacuum). A third part 26 communicably connects to the second part 18 and has a second valve 30 with a connection 31 different than the first valve connection 23 and adapted to receive a positive pressure source 32. The connections 23 and 31 can be of a threaded or quick connect design. A fourth part 34 has a pressure meter 36 operably connects thereto, wherein the first valve 22 and the second valve 30 are independently actuatable such that the pressure meter 36 reads a positive pressure when the second valve 30 is open and the first valve 22 is closed, so as to receive pressurized fluid from the positive pressure source 32, and reads a negative pressure when the first valve 22 is open and the second valve 30 is closed, so as to receive a vacuum from the negative pressure source 24. A pressure relief valve 38 is also operably connected to the device 10, here shown communicably connected to the second part 20 to relieve the positive pressure if it exceeds a predetermined amount in the conduit layout 12.

The pressure testing device 10 can be used for testing plumbing and gas line installations and repairs. For example, the pressure testing device 10 can test the pressure of waste lines, water lines, gas lines, and vent lines. The pressure testing device 10 can be used for new and repair work in residential, commercial, and industrial areas.

The pressure testing device 10 can perform tests ranging from ounces to pounds and on lines that range from ½" to 2". The pressure testing device 10 (See FIG. 1) can be made of various materials or like materials and include separate or unitary structure in the case of molding one or more parts. Here, the exemplary pressure testing device 10 depicts a first part 18 of a rubber tube which can be expended about the first conduit portion 14 and includes adjustable tightening bands 15, 17 to seal about conduit portion 14 and second part 20, respectively. The second part 20 and third part 26 can be made of metal and/or plastic materials and here are seen as T- or cross shaped members. Fourth part 34 can likewise be made of metal and/or plastic parts and those conventional for making a pressure meter as is known in the art. The pressure testing device 10 can be made of a connection size as is desired to include ½", ¾", 1"1¼", 1½", and 2".

An aspect of the invention is to provide a method of pressure testing a conduit structure to determine if there is a leak in the structure. In a broader sense, a method of pressure testing a conduit structure to determine if there is a leak in the conduit layout 12 having a first conduit portion 14 thereof open for connection and a remainder of the conduit layout closed, includes employing a pressure testing device. The pressure testing device has a first part having a coupling end for sealably connecting to the first conduit portion, a second part communicably connecting to the first part and having a valve connection adapted to receive one of a positive pressure source and a negative pressure source, and a pressure meter operably connected to the pressure testing device, wherein the valve is open to receive one of the positive pressure source and the negative pressure source, the pressure meter displays one of a positive pressure and a negative pressure, opening the valve to receive one of the positive pressure source and positive pressure source, and reading the pressure on said pressure meter to determine if the pressure is being maintained.

In a preferred embodiment, the method includes employing a pressure testing device for testing a seal in a connected conduit layout having a first conduit portion of the conduit layout open for connection and a remainder of the conduit layout closed, which includes employing a first part having a coupling end for sealably connecting to the first conduit portion, a second part communicably connecting to the first part and having a first valve connection adapted to receive a negative pressure source, a third part communicably connecting to the second portion and having a second valve connection different than part first valve connection and adapted to receive a positive pressure source, and a fourth part having a pressure meter operably connected to the pressure testing device, wherein the first valve and the second valve are independently actuatable such that the pressure meter reads a negative pressure when the second valve is closed and the first valve is open to receive a vacuum and reads a positive pressure when the first valve is closed and the second valve is open to the positive pressure source. The method further includes opening the first valve and closing the second valve and placing the conduit layout under a predetermined negative pressure through the first valve connection and reading the pressure meter to determine if the conduit layout is maintaining the predetermined negative pressure. The method of further includes the step of opening the second valve and closing the first valve and placing the conduit layout under a predetermined positive pressure through the second valve connection and reading the pressure meter to determine if the conduit layout is maintaining the predetermined positive pressure. It is contemplated that the pressure sources 24 and 32 can be switched and thus operation of the valves affects the pressure meter 36 as a function of this and the opening/closing of the valves 22 and 30.

Currently, plumbers or gas workers have to use an assortment of fittings and nipples in different sizes to match up with the male thread size requirements for that particular job. The invention is all that is needed for testing pressure and checking for leaks on the job. The above described invention is intended to be exemplary of the preferred embodiments but not limiting. Accordingly, the appended claims should be afforded the modifications, derivations and improvements readily apparent to those skilled in the art.

What is claimed is:

1. A pressure testing device for testing a seal in a connected conduit layout having a first conduit portion of the conduit layout open for connection and a remainder of the conduit layout closed, the device includes:

a first part having a coupling end for sealably connecting to the first conduit portion;

a second part communicably connecting to said first part and having a first valve connection adapted to receive a first pressure source;

a third part communicably connecting to said second part and having a second valve connection different than said first valve connection and adapted to receive a second pressure source different from said first pressure source; and a fourth part having a pressure meter operably connected to said pressure testing device, wherein said first valve connection and said second valve connection are independently actuatable such that said pressure meter reads a first pressure when said second valve connection is closed and said first valve connection is open to receive said first pressure source and reads a second pressure when said first valve connection is closed and said second valve connection is open to receive said second pressure source.

2. A method of pressure testing a conduit structure to determine if there is a leak in a conduit layout having a first conduit portion of the conduit layout open for connection and a remainder of the conduit layout closed, the method includes;
- employing a first part having a coupling end for sealably connecting to the first conduit portion;
- a second part communicably connecting to said first part and having a first valve connection adapted to receive a first pressure source;
- a third part communicably connecting to said second part and said third part having a second valve connection different than the first valve connection and adapted to receive a second pressure source different from said first pressure source; and
- a fourth part having a pressure meter operably connected to said pressure testing device, wherein said first valve connection and said second valve connection are independently actuatable such that said pressure meter reads a first pressure when said second valve connection is closed and said first valve connection is open to receive said first pressure source and reads a second pressure when said first valve connection is closed and said second valve connection is open to receive said second pressure source.

3. The method of claim 2, wherein said first pressure source is one of a positive and a negative pressure and which further includes opening said first valve connection and closing said second valve connection and placing the conduit layout under a predetermined pressure through said first valve connection and reading said pressure meter to determine if the conduit layout is maintaining the predetermined pressure.

4. The method of claim 2, wherein said second pressure source is one of a positive pressure and a negative pressure and further includes the step of opening said second valve connection and closing said first valve connection and placing the conduit layout under a predetermined pressure through said second valve connection, and reading said pressure meter to determine if the conduit layout is maintaining the predetermined positive pressure.

* * * * *